United States Patent [19]

Trujillo et al.

[11] Patent Number: 5,555,848
[45] Date of Patent: Sep. 17, 1996

[54] PET/FLEA COLLAR

[76] Inventors: Wendy J. Trujillo; Richard S. Trujillo, both of 17500 Hoot Owl Way, Morgan Hill, Calif. 95037

[21] Appl. No.: 443,596

[22] Filed: May 17, 1995

[51] Int. Cl.⁶ .................................................. A01K 27/00
[52] U.S. Cl. ............................ 119/654; 119/860; 119/856
[58] Field of Search ..................................... 119/860, 861, 119/863

[56] References Cited

U.S. PATENT DOCUMENTS

| | | | |
|---|---|---|---|
| 2,342,066 | 10/1942 | Tramill | 119/861 X |
| 2,401,253 | 4/1944 | Lamb, Jr. | 119/861 |
| 2,791,202 | 9/1955 | Doyle | 119/861 |
| 3,477,409 | 10/1967 | Costanzo | 119/860 X |
| 4,184,452 | 1/1980 | Buzzell et al. | 119/861 |
| 4,208,986 | 6/1980 | Costanzo | 119/860 |
| 4,218,991 | 8/1980 | Cole | 119/861 |
| 5,109,803 | 5/1992 | Dunham et al. | 119/861 |

FOREIGN PATENT DOCUMENTS 2645402  10/1990  France ..................................... 119/861

*Primary Examiner*—Robert P. Swiatek
*Assistant Examiner*—Yvonne Abbott

[57] ABSTRACT

A pet/flea collar including a band with an exterior surface, an interior surface, a first end including a buckle, a second end having a buckle engaging portion with a plurality of holes formed thereon and a pair of vertical sided edges therebetween and having a predetermined length and width sized to be formed into a cylindrical configuration by coupling the buckle and the buckle engaging portion. A ribbon of material is included which has an exterior surface, an interior surface positionable on the interior surface of the band, a first end, a second end and a pair of vertical side edges. The ribbon is permanently attached to the interior surface of the band and form a pocket on the band. A strip of insecticide impregnate material is sized for placement in the pocket formed on the band.

1 Claim, 4 Drawing Sheets

FIG 1
_PRIOR ART_
FIG 2
_PRIOR ART_
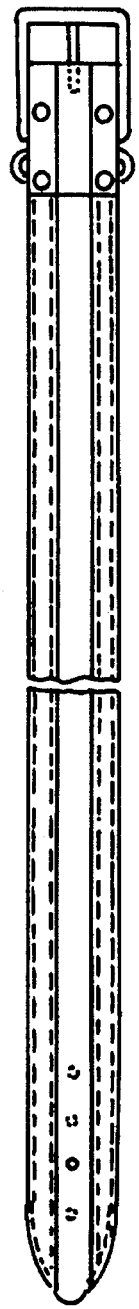
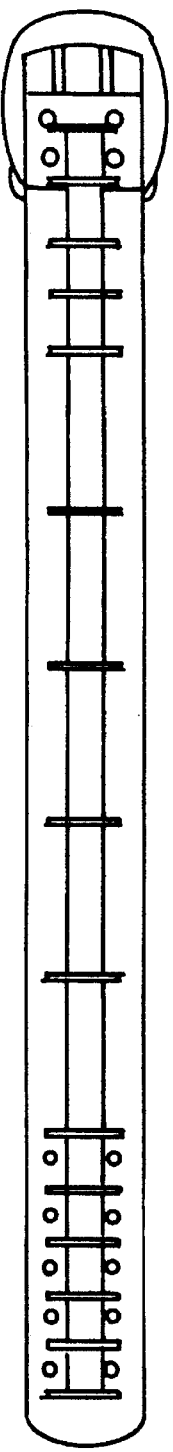

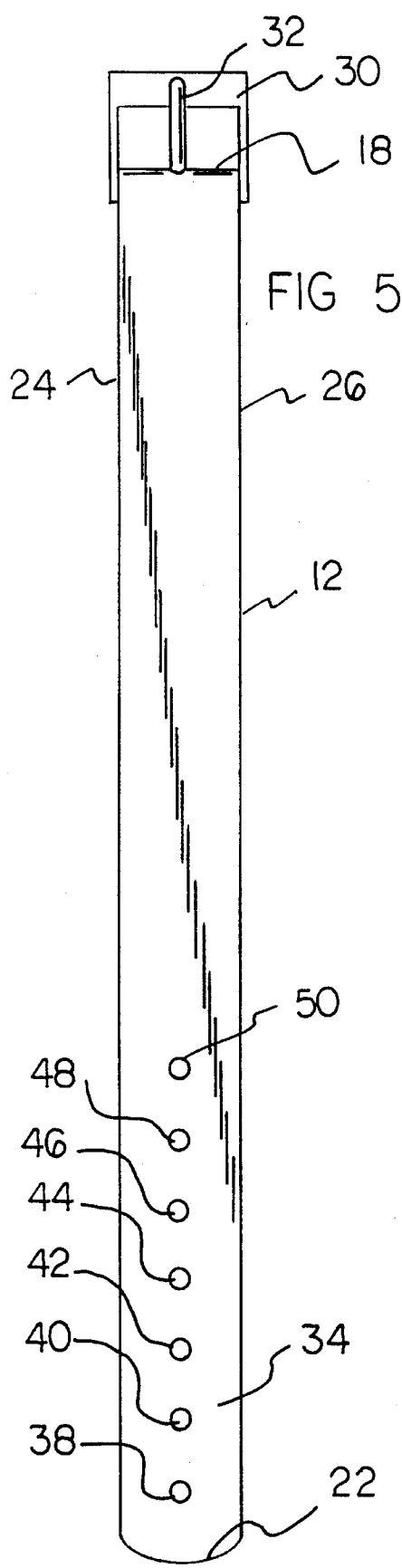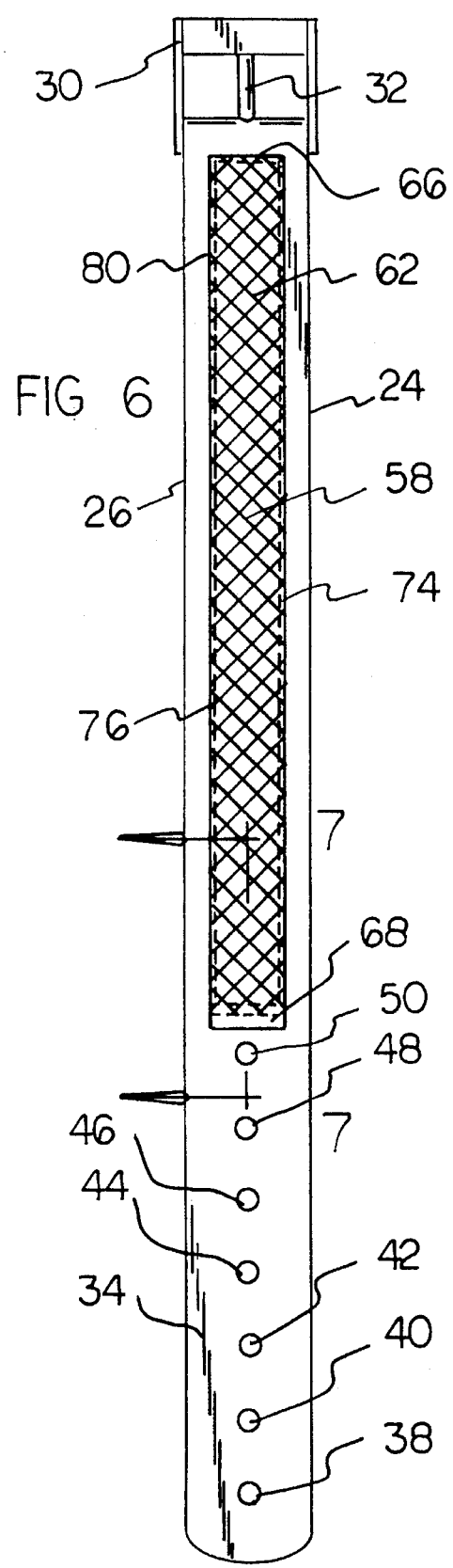

PET/FLEA COLLAR

BACKGROUND OF THE INVENTION

1. Field of the Invention

The present invention relates to a pet/flea collar and more particularly pertains to eliminating the need for a pet to wear a second collar for protection from ectoparasites and further enhancing the appearance of the pet by conveniently hiding the insecticide strip in an inner pocket of the pet/flea collar.

2. Description of the Prior Art

The use of flea collars on animals is known in the prior art. More specifically, flea collars heretofore devised and utilized for the purpose of controlling fleas on pets are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,852,416 to Grubb and Baxter discloses a tick and flea collar of solid solution plasticized vinylic resin-carbamate insecticide. U.S. Pat. Nos. 4,224,901 to Carey discloses a combination inner flea-tick collar and outer-protective collar for animals. 297, 776 to Bridges discloses a combined animal collar and flea repellant holder. 317,217 to Beutler discloses a flea collar concealer. Lastly, U.S. Pat. No. to Skwirz discloses a pet collar or similar article.

In this respect, the pet/flea collar, according to the present invention, substantially departs from the conventional concepts and designs of the prior art, and in doing so provides an apparatus primarily developed for the purpose of eliminating the need for a pet to wear a second collar for protection from ectoparasites and further enhancing the appearance of the pet by conveniently hiding the insecticide strip in an inner pocket of the pet/flea collar.

Therefore, it can be appreciated that there exists a continuing need for a new and improved pet/flea collar which can be used for eliminating the need for a pet to wear a second collar for protection from ectoparasites and further enhancing the appearance of the pet by conveniently hiding the insecticide strip in an inner pocket of the pet/flea collar. In this regard, the present invention substantially fulfills this need.

SUMMARY OF THE INVENTION

In view of the foregoing disadvantages inherent in the known types of flea collars now present in the prior art, the present invention provides an improved pet/flea collar. As such, the general purpose of the present invention, which will be described subsequently in greater detail, is to provide a new and improved pet/flea collar and method which has all the advantages of the prior art and none of the disadvantages.

To attain this, the present invention essentially comprises a band of flexible material and has an exterior surface and an interior surface and a first end and a second end and a pair of vertical side edges. The first end includes a buckle formed of a rigid material having a buckle tongue. The second end has a buckle engaging portion with a plurality of holes formed thereon for selective coupling with the buckle tongue. The holes include a first hole adjacent to the second hole and a last hole remote from the second hole. The first end further includes a D-ring spaced from the buckle and formed of a rigid material capable of receiving the second end upon coupling of the buckle and buckle engaging portion. The interior surface has a pile-type fastener assembly attached thereto that is adjacent to a last hole of the buckle engaging portion of the band. The band further has a predetermined length and width sized to be formed into a generally cylindrical configuration by coupling the buckle and the buckle engaging portion. A flexible ribbon is formed of a air permeable material. The ribbon has an exterior surface and an interior surface and a first end and a second end including a pile-type fastener assembly and a pair of vertical sides edges. The ribbon haw diamond configured holes therein. The ribbon is about 75% of the band and positionable on the interior surface of the band with the first end of the ribbon spaced from the first end of the band and adjacent to the D-ring. The second end of the ribbon is adjacent to the last hole of the buckle engaging portion of the band. The pair of vertical side edges of the ribbon are spaced from the vertical side edges of the band. The ribbon is permanently attached to the interior surface of the band by a stitched seam sewn along the first end and the vertical side edges of the ribbon. Attaching the ribbon to the band forms a pocket on the interior surface of the band. The pocket has an opening formed at the second end of the ribbon and the pile-type fastener assembly of the ribbon is capable of engaging the pile-type fastener assembly of the band. Lastly, a strip of flexible material formed of an insecticide impregnate is included that is sized for placement in the pocket formed when the ribbon is attached to the band. The strip has a pair of rounded ends with a length about 75% of the length of the ribbon. The strip is capable of being slidably secured in the pocket when the pile-type fastener assembly of the ribbon couples with the pile-type fastener assembly of the band. The strip is capable of being slidably removed from the pocket by disengaging the pile-type fastener assemblies of the ribbon and the band.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pet/flea collar which has all of the advantages of the prior art flea collars and none of the disadvantages.

It is another object of the present invention to provide a new and improved pet/flea collar which may be easily and efficiently manufactured and marketed.

It is further object of the present invention to provide a new and improved pet/flea collar which is of durable and reliable constructions.

An even further object of the present invention is to provide a new and improved pet/flea Collar which is susceptible of a low cost of manufacture with regard to both materials and labor, and which accordingly is then susceptible of low prices of sale to the consuming public, thereby making such pet/flea collar economically available to the buying public.

Still yet another object of the present invention is to provide a new and improved pet/flea collar which provides in the apparatuses and methods of the prior art some of the advantages thereof, while simultaneously overcoming some of the disadvantages normally associated therewith.

Even still another object of the present invention is to eliminate the need for a pet to wear a second collar for protection from ectoparasites and further enhancing the appearance of the pet by conveniently hiding the insecticide strip in an inner pocket of the pet/flea collar.

Lastly, it is an object of the present invention to provide a new and improved pet/flea collar comprising a band having an exterior surface, an interior surface, a first end including a buckle, a second end having a buckle engaging portion with a plurality of holes formed thereon and a pair of vertical sided edges therebetween and having a predetermined length and width sized to be formed into a cylindrical configuration by coupling the buckle and the buckle engaging portion. The holes include a first hole adjacent to the second hole and a last hole remote from the second hole. A ribbon of material has an exterior surface, an interior surface positionable on the interior surface of the band, a first end, a second end and a pair of vertical side edges. The ribbon is permanently attached to the interior surface of the band forming a pocket on the band. A strip of insecticide impregnate material sized for placement in the pocket is formed on the band.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the prior art combination inner flea-tick collar and outer protective collar, for animals.

FIG. 2 is a perspective view of the preferred embodiment of the prior art combined animal collar and flea repellant holder.

FIG. 5 is top plan view of the exterior surface of the present invention.

FIG. 6 is top plan view of the interior surface of the present invention of FIG. 1.

DESCRIPTION OF THE PREFERRED EMBODIMENT

Figure 3:
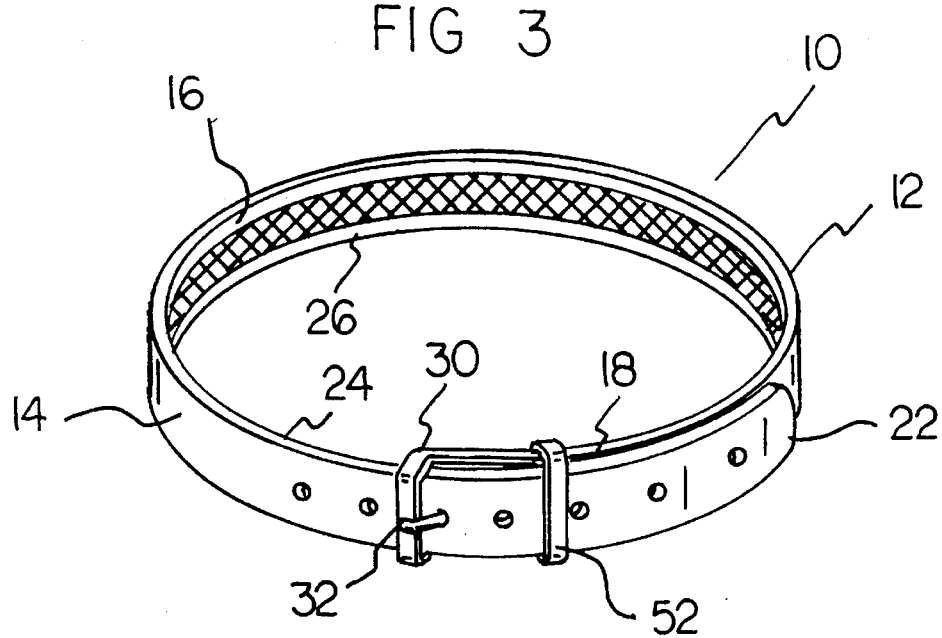
FIG. 3 is a perspective view of the preferred embodiment of the pet/flea collar constructed in accordance with the principles of the present invention.

With reference now to the drawings, and in particular to FIG. 3 thereof, the preferred embodiment of the new and improved pet/flea collar embodying the principles and concepts of the present invention and generally designated by the reference numeral 10 will be described.

The present invention, the pet/flea collar 10 is comprised of a plurality of components. Such components in their broadest context include a band, a ribbon and a strip. Such components are individually configured and correlated with respect to each other so as to attain the desired objective.

Figure 4:
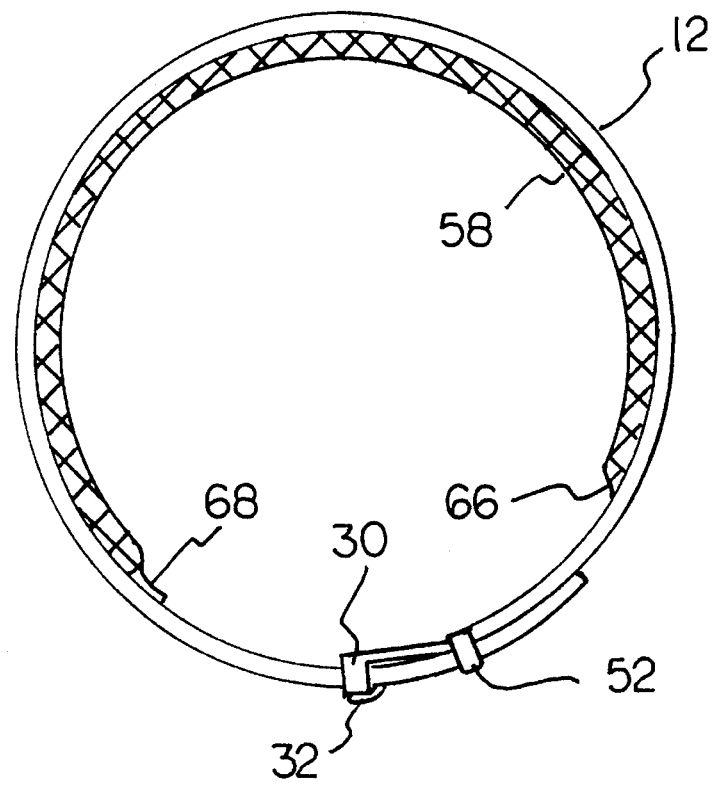
FIG. 4 is a side elevational view of the preferred embodiment of the present invention.
Figure 7:
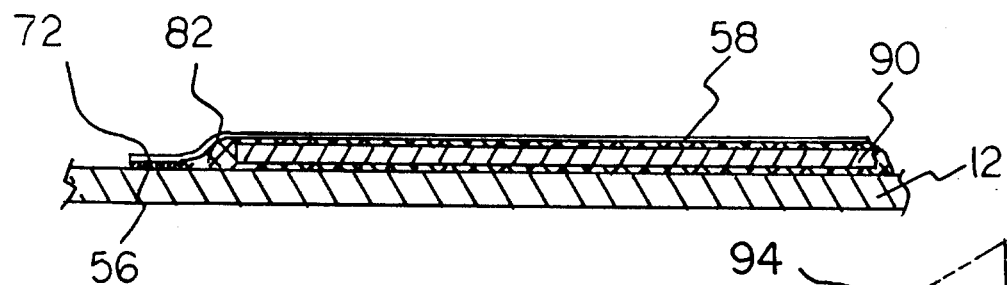
FIG. 7 is side cross sectional view of the present invention in an operable configuration.
Figure 8:
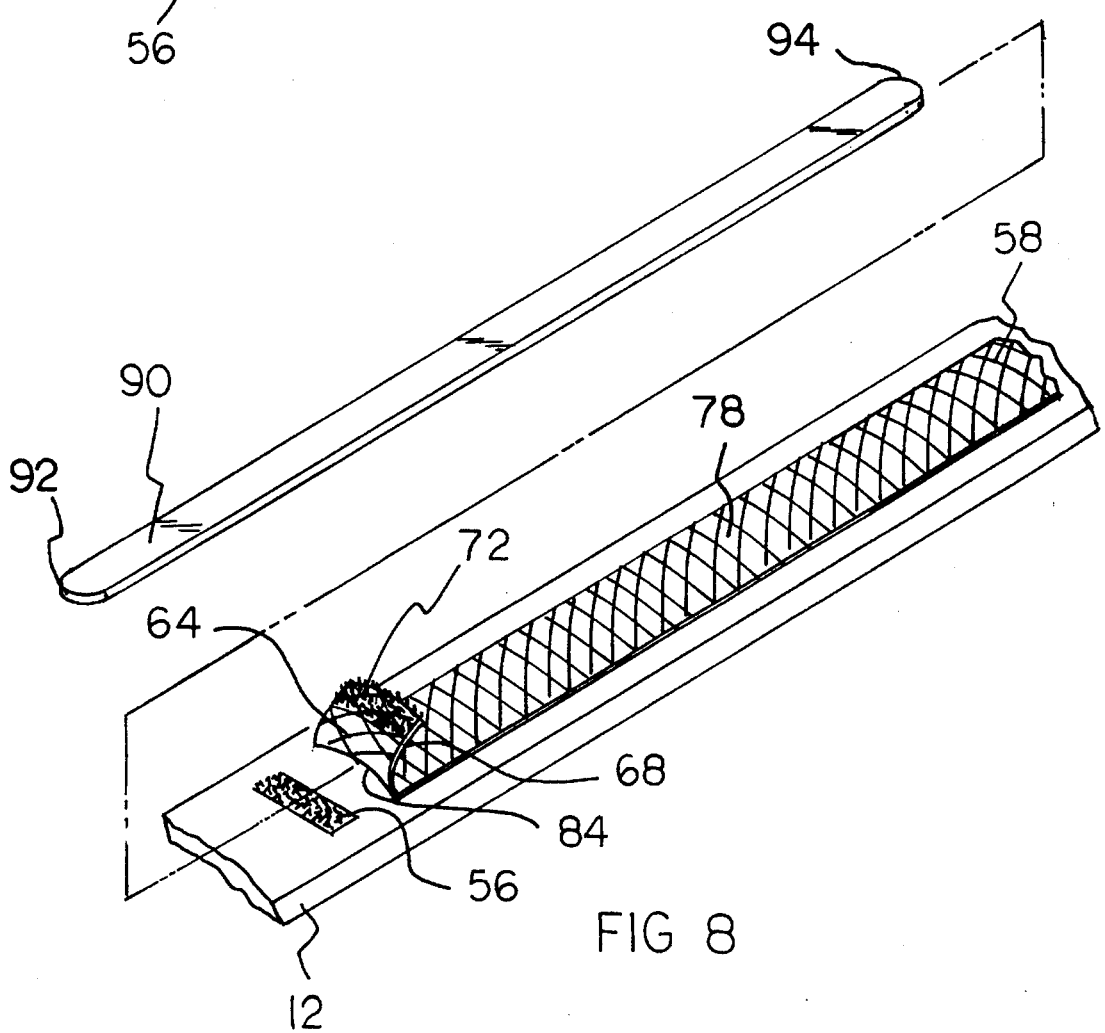
FIG. 8 is an enlarged fragmentary perspective view of the placement of a insecticide strip in the pocket of the present invention The same reference numerals refer to the same parts through the various Figures.

Specifically, present invention includes a band 12. The band is formed of a flexible material such as leather or nylon. The band has an exterior surface 14 and an interior surface 16 and a first end 18 and a second end 22 and a pair of vertical side edges 24 and 26 as shown in FIG. 3. The first end includes a buckle 30 formed of a rigid material having a buckle tongue 32 as shown in FIGS. 5 and 6. The buckle preferably is formed of a metal or metal alloy. The second end has a buckle engaging portion 34 with a plurality of holes 38, 40, 42, 44, 46, 48 and 50 formed thereon for selective coupling with the buckle tongue, as shown in FIGS. 5 and 6. The holes include a first hole 38 adjacent to the second hole 40 and the last hole 50 remote for the second hole. As best illustrated in FIG. 3, the first end further includes a D-ring 52 spaced from the buckle and formed of a rigid material. The D-ring is capable of receiving the second end 22 upon coupling of the buckle 32 and buckle engaging portion 34. The interior surface has a pile-type fastener assembly 56 attached thereto that is adjacent to the last hole 50 of the buckle engaging portion of the band. The pile-type fastener assembly of the band is shown in FIG. 8. The band further has a predetermined length and width sized to be formed into a generally cylindrical configuration by coupling the buckle and the buckle engaging portion as shown in FIG. 4. The band provides an attractive collar for the animal. Additionally the band provides a collar that the pet owner may attach a leash to for walking the animal, Also included is a flexible ribbon 58 of air permeable material as shown in FIG. 6. The ribbon is a nylon mesh having an exterior surface 62 and an interior surface 64 and a first end 66 and a second end 68 with a pile-type fastener assembly 72 and a pair of vertical sides edges 74 and 76. The ribbon has a plurality of diamond configured holes 78 therein. The ribbon is about 75% of the length of the band and positioned on the interior surface 16 of the band with the first end of the ribbon spaced from the first end 18 of the band and adjacent to the D-ring 52. The second end of the ribbon being adjacent the last hole 50 of the buckle engaging portion of the band, and the pair of vertical side edges 74 and 76 are spaced from the vertical side edges 24 and 26 of the band as shown in FIG. 6. The ribbon being permanently attached to the interior surface 16 of the band 12 by a stitched seam 80 sewn along the first end and the vertical side edges of the ribbon. Attaching the ribbon to the band forms a pocket 82 on the interior surface of the band. The pocket has an opening 84 formed at the second end of the ribbon. The pile-type fastener assembly 72 of the ribbon capable of engaging the pile-type fastener assembly 56 of the band as shown in FIG. 7.

Lastly, a strip 90 is provided. The strip is formed of flexible material formed of an insecticide impregnate. The strip may be a commercially available flea collar with the buckle cut off. The strip is sized for placement in the pocket 82 formed by the ribbon 58 being attached to the band 12. The strip has a pair of rounded ends 92 and 94 with a length about 75% of the length of the ribbon. The strip is capable of being slidably secured in the pocket when the pile-type fastener assembly 72 of the ribbon couples with the pile-type fastener assembly 56 of the band as shown in FIG. 7. The strip is capable of being slidably removed from the pocket by disengaging the pile-type fastener assemblies of the ribbon and the band. Once the insecticide has worn off the strip the strip is removed and replaced with a new strip.

The present invention is a pet/flea collar that has a pocket built on to its inner surface which can receive and hold therein an insecticide strip for placement around the animal's neck. The collar is made from a band of nylon or leather that can be adjusted to fit around the neck of a dog, a cat or an animal of similar size. The band has a buckle with a tongue at one end and a D-ring to which a leash can be attached adjacent the buckle. The other end of the band has spaced apart holes that can selectively engage the buckle tongue when placed around the neck of an animal. The inner surface of the band has attached to it a ribbon of nylon mesh. The ribbon attached to the band forms a pocket on the inner surface of the band. The pocket has an opening at one end with a pile-type of fastener attached. An insecticidal strip is placed into the pocket. The strip may be formed by taking a standard flea collar that is currently on the market and cutting the buckle end off. The strip formed from the standard flea collar with the buckle removed can be placed into the pocket of the pet/flea collar. The strip is secured in the pocket by fastening the pocket end to the complementary pile-type fastener on the inner surface of the band. The strip can be removed once its useful life has expired.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved pet/flea collar comprising, in combination:

a band of flexible material having an exterior surface and an interior surface and a first end and a second end and a pair of vertical side edges, the first end including a buckle formed of a rigid material having a buckle tongue, the second end having a buckle engaging portion with a plurality of holes formed thereon for selective coupling with the buckle tongue, the holes including a first hole adjacent to a second hole and a last hole remote from the second hole, the first end further including a D-ring spaced from the buckle and being formed of a rigid material capable of receiving the second end upon coupling of the buckle and buckle engaging portion, the interior surface having a pile-type fastener assembly attached thereto and being adjacent to the last hole of the buckle engaging portion of the band, the band further having a predetermined length and width sized to be formed into a generally cylindrical configuration by coupling the buckle and the buckle engaging portion;

a flexible ribbon of air permeable material being a nylon mesh, the ribbon having an exterior surface and an interior surface and a first end and a second end with a pile-type fastener assembly and a pair of vertical sides edges, the ribbon having diamond configured holes therein, the ribbon being about 75% of the length of the band and positionable on the interior surface of the band with the first end of the ribbon spaced from the first end of the band and adjacent to the D-ring, the second end of the ribbon being adjacent to the last hole of the buckle engaging portion of the band, and the pair of vertical side edges being spaced from the vertical side edges of the band, the ribbon being permanently attached to the interior surface of the band by a stitched seam sewn along the first end and the vertical side edges of the ribbon and forming a pocket therein, the pocket having an opening formed at the second end of the ribbon and adjacent the last hole of the band, the pile-type fastener assembly of the ribbon being integral with the pocket opening and capable of engaging the pile-type fastener assembly of the band; and a strip of flexible material formed of an insecticide impregnate sized for placement in the pocket formed by the ribbon being attached to the band, the strip having a pair of rounded ends with a length about 75% of the length of the pocket, the strip capable of being slidably secured in the pocket when the pile-type fastener assembly of the ribbon couples with the pile-type fastener assembly of the band, the strip capable of being slidably removed form the pocket by disengaging the pile-type fastener assemblies of the ribbon and the band.

* * * * *